United States Patent
Aragon

(10) Patent No.: US 8,355,352 B2
(45) Date of Patent: Jan. 15, 2013

(54) ACCESS POINT AGITATION

(75) Inventor: David Bradburn Aragon, Berkeley, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 616 days.

(21) Appl. No.: 12/350,927

(22) Filed: Jan. 8, 2009

(65) Prior Publication Data

US 2010/0172276 A1    Jul. 8, 2010

(51) Int. Cl.
G08C 17/00    (2006.01)

(52) U.S. Cl. .................. 370/311; 455/13.4; 455/127.1; 455/127.5

(58) Field of Classification Search .............. 370/311, 370/310, 310.2, 328, 338, 349; 455/13.4, 455/127.1, 127.5, 343.1, 343.2, 343.5
See application file for complete search history.

(56) References Cited

U.S. PATENT DOCUMENTS

| | | | |
|---|---|---|---|
| 6,006,101 A | 12/1999 | Sakamoto | |
| 7,349,355 B2 * | 3/2008 | Sengupta et al. | 370/311 |
| 7,756,548 B2 * | 7/2010 | Laroia et al. | 455/561 |
| 8,203,986 B2 | 6/2012 | Aragon et al. | |
| 2004/0259542 A1 * | 12/2004 | Viitamaki et al. | 455/426.2 |
| 2005/0154933 A1 * | 7/2005 | Hsu et al. | 713/320 |
| 2005/0190714 A1 * | 9/2005 | Gorbatov et al. | 370/318 |
| 2007/0205872 A1 * | 9/2007 | Kim et al. | 340/10.33 |
| 2008/0117849 A1 | 5/2008 | Borran et al. | |
| 2010/0002610 A1 * | 1/2010 | Bowser et al. | 370/311 |
| 2010/0195549 A1 | 8/2010 | Aragon et al. | |
| 2011/0105200 A1 | 5/2011 | Tomita et al. | |

OTHER PUBLICATIONS

Thomson, Allan; Green Sleep; Power Point slide show; IEEE standards committee meeting Jul. 15, 2008; pp. 1-20.
Co-pending U.S. Appl. No. 12/365,891, filed Feb. 4, 2009.
Office Action for U.S. Appl. No. 12/365,891, mailed Aug. 29, 2011.
U.S. Appl. No. 13/526,034, filed Jun. 18, 2012.

* cited by examiner

*Primary Examiner* — Kibrom T Hailu
*Assistant Examiner* — Dady Chery

(57) ABSTRACT

A technique for controlling the amount of power consumed by access points (APs) of a wireless network involves implementing power-saving APs (PSAPs). It would be desirable for the PSAPs to be in sleep mode during periods of low activity, and at full power during periods of high activity. To that end, a PSAP agitation (PSAPA) engine can be implemented to agitate PSAPs in response to increases in wireless activity, and put PSAPs to sleep in response to decreases in wireless activity.

16 Claims, 12 Drawing Sheets

600 ⟶

ACCESS POINT AGITATION

BACKGROUND

Wireless access points (APs) consume power. Typically a wireless network includes many APs that are regularly on to ensure wireless service is available to stations accessing the wireless network.

An individual AP draws a moderate amount of power by itself, and many APs across a wireless network can collectively draw a large amount of power. Such APs may not be servicing clients and may be wasting power. In a business environment or on educational campus, hundreds or even thousands of APs can be used to provide wireless connectivity throughout the network. In similar environments significant amounts of power can be consumed.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for controlling the amount of power consumed by access points (APs) of a wireless domain involves implementing power-saving APs (PSAPs). It would be desirable for the PSAPs to be in sleep mode during periods of low activity, and at full power during periods of high activity. To that end, a PSAP agitation (PSAPA) engine can be implemented to agitate PSAPs in response to increases in wireless activity, and put PSAPs to sleep, or fail to agitate the PSAPs, in response to decreases in wireless activity.

When there is no wireless activity, all of the PSAPs can be asleep. However, it may be desirable to introduce vigilant APs (VAPs) that always operate at or near full power to detect wireless activity. VAPs can be placed in such a way that they cover a designated hot spot. At some point, wireless activity may reach a wireless activity threshold level, and the PSAPA engine can agitate one or more PSAPs to help manage the wireless traffic. PSAPs that are awake and VAPs are likely to be indistinguishable to wireless stations accessing services through them.

A systems administrator can establish a wireless activity threshold based upon a wireless activity parameter. The wireless activity parameters can include RF energy detected, duration of wireless activity, quality of service (QoS), or other values. For example, if client activity is largely voice, it may be desirable to have more active APs to ensure that the voice quality is good, whereas it is not as critical if the client activity is largely data. The PSAPA engine can use the threshold to determine when to agitate PSAPs.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
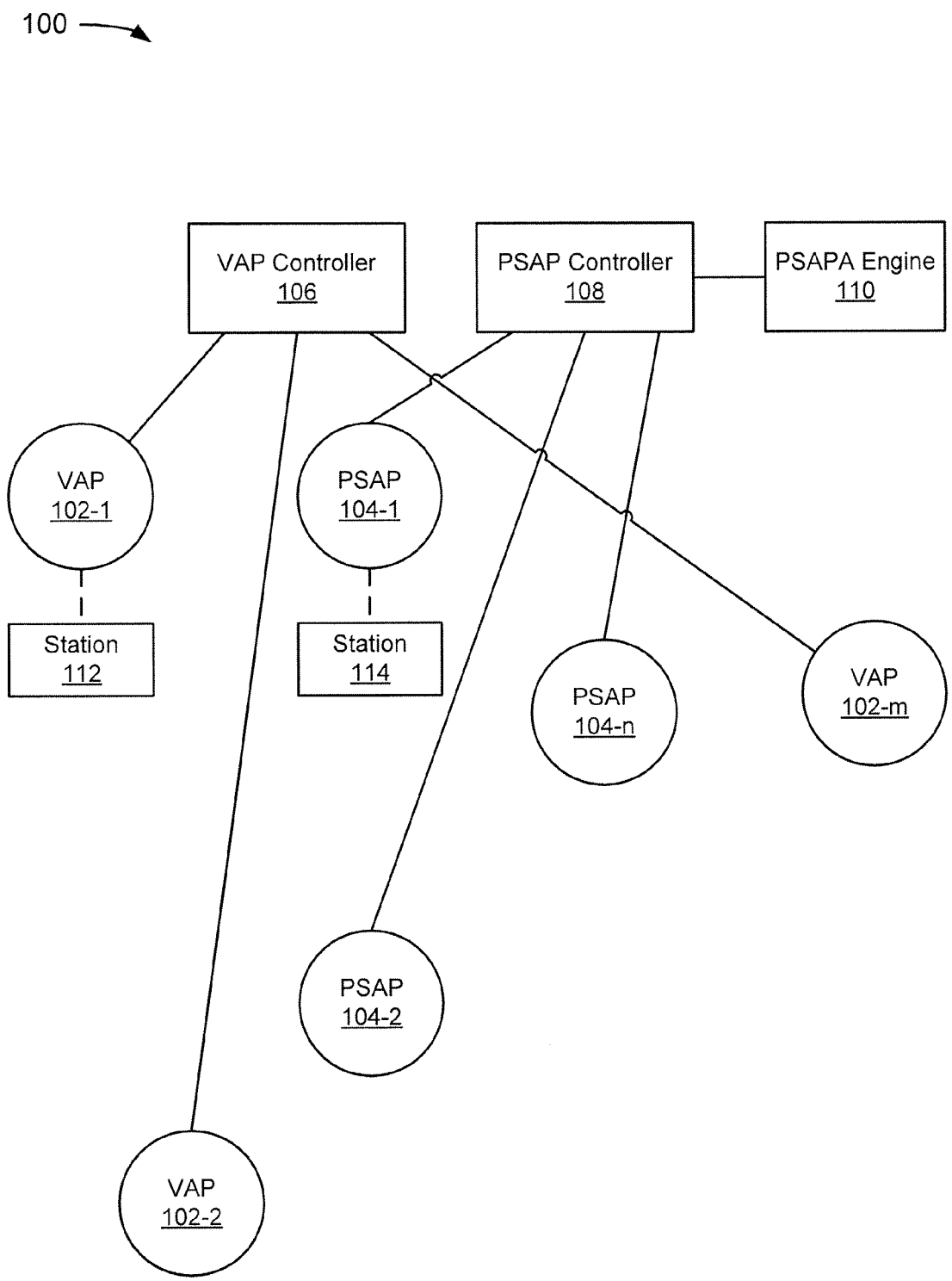
FIG. 1 depicts an example of a system for controlling power consumption of a wireless domain based on fluctuations in wireless station activity.

FIG. 1 depicts an example of a system 100 for controlling power consumption of a wireless domain based on fluctuations in wireless station activity. The system 100 includes a vigilant access point (VAP) 102-1 and VAPs 102-2 to 102-$m$ (collectively VAPs 102), a power saving access point (PSAP) 104-1 and PSAPs 104-2 to 104-$n$ (collectively PSAPs 104), a VAP controller 106, a PSAP controller 108, and a PSAP agitation (PSAPA) engine 110. In the example of FIG. 1, the VAPs 102 are coupled to the VAP controller 106 and the PSAPs 104 are coupled to the PSAP controller 108.

In the example of FIG. 1, the VAPs 102 are access points (APs) that are, in normal operation, continuously on. This enables the VAPs 102 to communicate rapidly with wireless stations even when the wireless domain is in a power-save state. A station, as used herein, may be referred to as a device with a media access control (MAC) address and a physical layer (PHY) interface to the wireless medium that comply with the IEEE 802.11 standard. As such, in a non-limiting embodiment, the VAPs 102, and APs in general, are stations. In alternative embodiments, a station may comply with a different standard than IEEE 802.11, may be referred to as something other than a "station," and may have different interfaces to a wireless or other medium.

In a non-limiting embodiment, the VAPs 102 are hardware units that act as a communication hub by linking wireless mobile stations to a wired backbone network. This can enable, the VAPs 102 to connect users to other users within the network and/or to serve as the point of interconnection between a WLAN and a fixed wire network. The number of VAPs 102 that are desirable for a given implementation can depend upon the desired size of a wireless domain. For example, it may be desirable to locate the VAPs 102 such that they cover the entire area/space of the wireless domain. An implementation of an AP, provided by way of example but not limitation, includes a TRAPEZE NETWORKS® MOBILITY POINT® (MP®) AP. An implementation of a wireless domain, provided by way of example but not limitation, includes a TRAPEZE NETWORKS® SMART MOBILE® (TRAPEZE SMART MOBILE®) wireless domain.

In operation, the VAPs 102 transmit and receive data (and may therefore be referred to as transceivers) using one or more radio transmitters. For example, one or more of the VAPs may have two associated radios, one which is configured for 5 GHz transmissions, and the other which is configured for 2.4 GHz transmissions. (Other bands are acceptable, too.) In a non-limiting embodiment, the VAPs 102 transmit and receive information as radio frequency (RF) signals to and from a wireless station over an Ethernet connection. The VAPs 102 can transmit and receive information to and from their associated wireless exchange switches. Connection to a second wireless exchange switch provides redundancy. An implementation of a wireless exchange switch, provided by way of example but not limitation, includes a TRAPEZE NETWORKS® MOBILITY EXCHANGE® (MX®) switch.

In the example of FIG. 1, the PSAPs 104 are APs having power saving components that can be enabled and disabled. If a PSAP is implemented with only power saving components, then when the PSAP is asleep, it can consume zero power. If a PSAP is implemented with a subset of power saving components, then when the PSAP is asleep, it consumes less than full power, but more than zero power. It is possible to implement a PSAP with multiple power settings (e.g., full-, low-, and zero-power settings). A low-power setting might be, by way of example but not limitation, a sentry mode in which the PSAP is able to receive data via radio, but not transmit via radio. Examples of PSAPs are discussed in further detail later.

In a non-limiting embodiment, the PSAPs 104 are hardware units that act as a communication hub by linking wireless mobile stations to a wired backbone network. The number of PSAPs 104 that are desirable for a given implementation can depend upon the desired capacity of a wireless domain. For example, it may be desirable to locate the PSAPs 104 such that they can handle the amount of traffic that is expected in a particular area of the wireless domain. Thus, in one possible implementation, the VAPs 102 provide continuous, but minimal, wireless coverage of a wireless domain, and the PSAPs 104 provide wireless coverage that is redundant with respect to that provided by the VAPs 102 in areas where a certain amount of wireless traffic is anticipated.

In a non-limiting embodiment, one or more of the PSAPs 104 can be implemented as radios (and perhaps other components) within a device that includes one or more of the VAPs 102. Advantageously, a VAP that is in an area of high wireless activity can agitate an "onboard" radio of the PSAP to help handle traffic. Since VAPs can be placed to cover, at least minimally, the entire area of a wireless domain, locating PSAPs in the same locations as one or more of the VAPs 102 should enable placement of the PSAPs in the wireless domain practically anywhere that might be considered beneficial.

In operation, the PSAPs 104 transmit and receive data using one or more radio transmitters. For example, one or more of the PSAPs may have two associated radios, one which is configured for 5 GHz transmissions, and the other which is configured for 2.4 GHz transmissions. In a non-limiting embodiment, the PSAPs 104 transmit and receive information as radio frequency (RF) signals to and from a wireless station over an Ethernet connection. In this example, in a low power mode, it may be desirable to turn off one of the radios, while in a zero power mode, it may be desirable to turn off both of the radios.

In the example of FIG. 1, the VAP controller 106 controls the VAPs 102 of the system 100. The VAP controller 106 can include practically any type of device that is capable of communicating with a communications network, such as, by way of example but not limitation, a server class computing system or a workstation. The VAP controller 106 can be distributed or centrally located. In a non-limiting example, the VAP controller 106 is connected to a wireless backbone network (not shown), either directly or indirectly through a wireless network. The VAP controller 106 can include a single controller for all of the VAPs 102; multiple controllers, one for each of the VAPs 102; or some arbitrary or convenient number of controllers, each for controlling a subset of the VAPs 102. In some implementations, the VAP controller 106 controls a "dumb" AP, while in other implementations, functionality of the VAP controller 106 can be implemented in whole or in part in a "smart" AP. The VAP controller 106 is typically aware of the associations of stations to all of the APs of the system 100.

In the example of FIG. 1, the PSAP controller 108 controls the PSAPs 104 of the system 100. The PSAP controller 108 can include practically any type of device that is capable of communicating with a communications network, such as, by way of example but not limitation, a server class computing system or a workstation. The PSAP controller 108 can be distributed or centrally located. In a non-limiting example, the PSAP controller 108 is connected to a wireless backbone network (not shown), either directly or indirectly through a wireless network. The PSAP controller 108 can include a single controller for all of the PSAPs 104; multiple controllers, one for each of the PSAPs 104; or some arbitrary or convenient number of controllers, each for controlling a subset of the PSAPs 104. In some implementations, the PSAP controller 108 controls a "dumb" AP, while in other implementations, functionality of the PSAP controller 108 can be implemented in whole or in part in a "smart" AP. The PSAP controller 108 is typically aware of the associations of stations to all of the APs of the system 100.

In the example of FIG. 1, the PSAPA engine 110 is coupled to the PSAP controller 108. As used in this paper, an engine includes a processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The PSAPA engine 110 is capable of determining when wireless activity is above a threshold, using wireless activity data typically provided at least in part by the APs (e.g., the VAPs 102 and the PSAPs 104 that are at least in sentry mode). When the PSAPA engine 110 determines that wireless activity is above a threshold, the PSAPA engine 110 informs the PSAP controller 108 that one or more of the PSAPs 104 should be agitated. Depending upon the implementation and/or embodiment, the PSAPA engine 110 may or may not inform the PSAP controller 108 when wireless activity is below a threshold. For example, the PSAPA engine 110 may inform the PSAP controller 108 that one of the PSAPs 104 should be agitated when a threshold is exceeded, and fail to inform the PSAP controller 108 when the threshold is not exceeded. When the PSAP controller 108 receives the agitation request from the PSAPA engine 110, it can agitate the relevant PSAP, which then stays awake for a predetermined period of time. If the PSAP is not agitated again, then it falls asleep after the predetermined period of time. Thus, there is no need for a "de-agitation" command. In an alternative embodiment, the PSAPs could be on as a default, and receive de-agitation commands to save power, or the PSAPs could remain in a given state until an agitation/de-agitation command causes the PSAP to switch to another state.

It should be noted that the VAP controller 106 and the PSAP controller 108 could be implemented as a single controller, or multiple controllers that share VAPs and PSAPs. The PSAP controller 108 is drawn as distinct from the VAP controller 106 for illustrative purposes, although the PSAPA engine 110 is only useful to the PSAP controller 108, since VAPs are always on (i.e., there is no need to agitate a VAP). In operation, controllers are engines implemented in special purpose hardware, firmware, or software embodied in a computer readable medium for execution by a processor.

In the example of FIG. 1, stations 112, 114 can include a laptop, desktop computing device, portable digital assistant (PDA), wireless telephone, or any other applicable computing device capable of communications on a wireless network. The stations 112, 114 can comply with any wireless standard for the transmission of data, or may comply with none at all. The stations 112, 114 include a radio for transmission of data and may have any other known or convenient interface to a wireless network or other medium. Typically, the stations 112, 114 can transmit and receive data as radio frequency (RF) signals using the radio or other interface.

In the example of FIG. 1, in operation, the VAPs 102 are assumed to be on. For illustrative purposes, the PSAPs 104 are assumed initially to be off. Since the VAPs 102 are on, the VAP controller 106 can monitor the wireless domain through the VAPs 102, which provide wireless activity data to the VAP controller 106 and/or the PSAPA engine 110. For illustrative purposes, the station 112 is turned on or comes within range of the wireless domain, and is wirelessly coupled to the VAP 102-1. For illustrative purposes, it is assumed that the station 112 does not provide sufficient wireless activity to pass a wireless activity threshold. Therefore, the PSAPs 104 remain asleep.

Later, additional stations (not shown) may be turned on or come within range of the wireless domain, but still not provide sufficient wireless activity to pass the wireless activity threshold. At some point, the station 114 is turned on or comes within range of the wireless domain, and the wireless activity then passes the wireless activity threshold. The PSAPA engine 110 receives the wireless activity data, determines that the wireless activity threshold is exceeded (perhaps for a certain duration, depending upon the implementation and/or embodiment), and informs the PSAP controller 108 that the PSAP 104-1 is to be agitated. The PSAP controller 108 agitates the PSAP 104-1, the PSAP 104-1 powers up and remains powered up for a period of time, and the station 114 is coupled to the PSAP 104-1. It should be noted that since the PSAP 104-1 is likely to take some time to power up, the station 114 may associate with one of the VAPs 102 while the PSAP 104-1 is powering up, and the VAP with which the station 114 has associated might hand off the station 114 (or some other station) when the PSAP 104-1 is powered up.

While the wireless activity exceeds the wireless activity threshold, the PSAPA engine 110 will continue to inform the PSAP controller 108 that the PSAP 104-1 is to be agitated, the PSAP controller 108 agitates the PSAP 104-1, and the PSAP 104-1 remains powered up for a period of time. When the wireless activity drops below the wireless activity threshold, the PSAPA engine 110 no longer informs the PSAP controller 108, and after the period of time is up, the PSAP 104-1 powers down.

Figure 2:
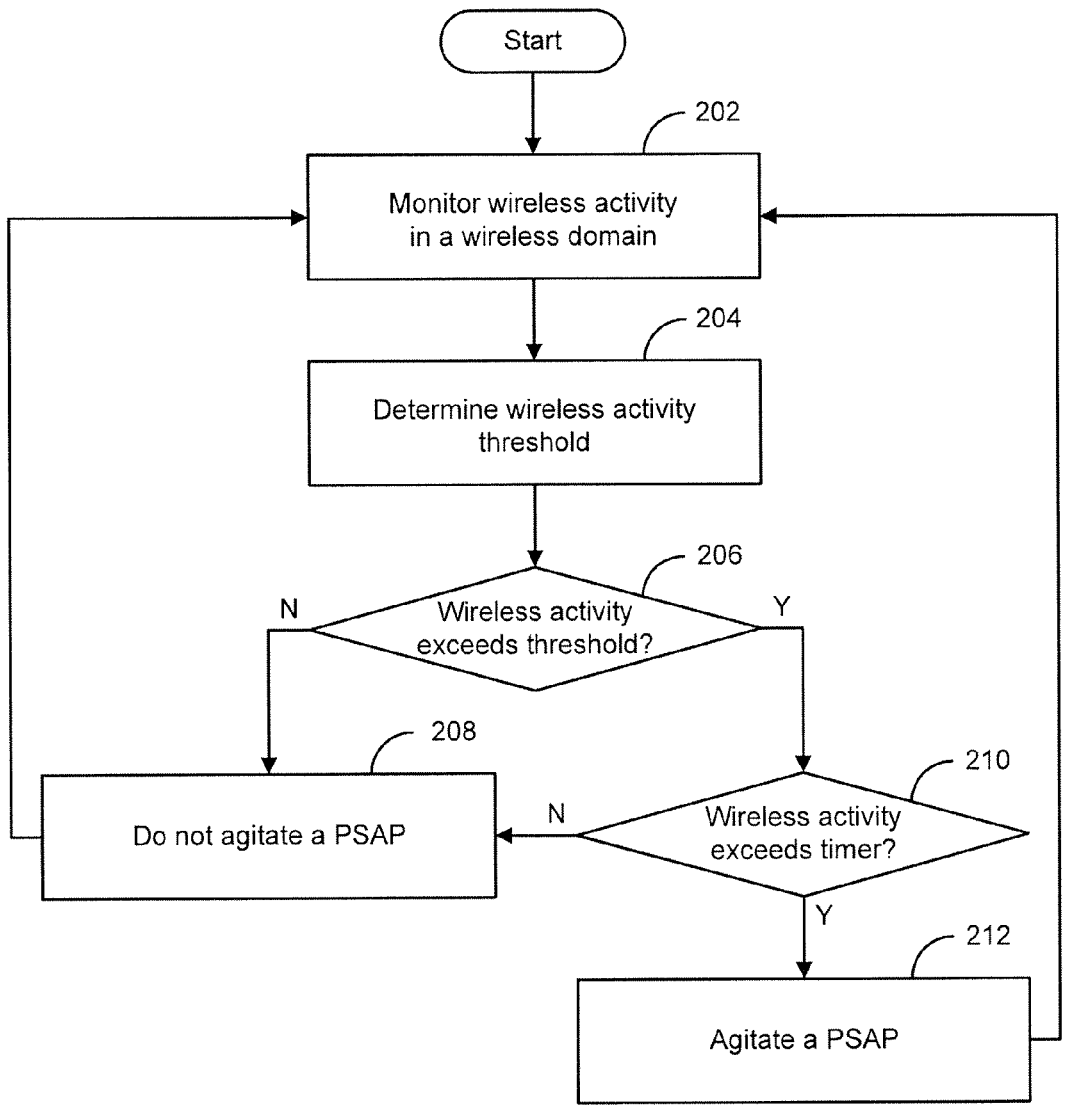
FIG. 2 depicts a flowchart of an example of a method for agitating a power-saving access point (PSAP).

FIG. 2 depicts a flowchart of an example of a method 200 for agitating a PSAP. The method 200 is organized as a sequence of modules in the flowchart. However, it should be understood that these and other modules associated with other methods described herein may be reordered for parallel execution or into different sequences of modules.

In the example of FIG. 2, the flowchart 200 starts at module 202 where wireless activity in a wireless domain is monitored. Wireless activity is typically, though not necessarily or only, detected when RF transmissions from one or more stations are received at an AP, such as a VAP or a PSAP that is at least in sentry mode, of the wireless domain. The APs send wireless activity data to a controller and/or PSAPA engine for analysis. The wireless activity data may or may not be preprocessed at the AP, depending upon the implementation and/or embodiment. The wireless activity data at least can provide information about the amount of wireless activity in the wireless domain, and the controller or some other engine knows about the capabilities of the APs of the wireless domain in handling the load. So a comparison of the capabilities of the APs and the wireless activity can indicate whether the capabilities of the APs are being pushed beyond an acceptable threshold.

In the example of FIG. 2, the flowchart 200 continues to module 204 where a wireless activity threshold is determined. The wireless activity threshold can be set by a human (e.g., systems administrator) or software agent. The threshold can be based upon an estimated amount of wireless activity, the ratio of non-AP stations to APs, or other parameters. The key with respect to setting the wireless activity threshold is to ensure, as much as is possible, that PSAPs can be agitated when the wireless traffic reaches a point (and perhaps remains at or above that point for a period of time) where a decision-maker has determined that the VAPs and already agitated PSAPs cannot handle the wireless traffic adequately. Whether the APs can handle the wireless traffic adequately may be based on measurements, empirical or historical data, QoS considerations, or even opinion.

In a simple implementation, the wireless activity threshold is static in that it does not vary in response to the wireless activity data obtained through the APs of the wireless domain. In this simple implementation, determining the wireless activity threshold is trivial; the system simply reads the threshold from memory for comparison with current estimated wireless activity. If there are multiple PSAPs, then each of the PSAPs can be agitated at the same or different thresholds. In a first global threshold example, each VAP may have two nearby PSAPs. Reaching a first threshold causes a first of the PSAPs near each VAP to be agitated and reaching a second threshold causes a second of the two PSAPs near each VAP to be agitated. In this way, multiple PSAPs are agitated when reaching the first threshold and multiple PSAPs are agitated when reaching the second threshold. In a second global threshold example, each PSAP in the wireless domain could be agitated when reaching different thresholds. In these simple implementations, the threshold can be thought of as global with respect to the wireless domain because it does not take into account wireless activity in different areas of the wireless domain.

As the size of the wireless domain increases, the desirability of a wireless activity threshold at each VAP or active PSAP increases because wireless activity may be high in one corner of the wireless domain, but low in another corner of the wireless domain; so agitating a PSAP when wireless activity exceeds a global wireless activity threshold will not help if the PSAP is agitated in the low activity corner. In a first local wireless activity threshold example, each VAP has a wireless activity threshold associated with it, and when the wireless activity threshold is exceeded, a PSAP is agitated. Each VAP can have multiple wireless activity thresholds, and as each wireless activity threshold is exceeded, an additional PSAP is agitated. In a second local wireless activity threshold example, each VAP has a wireless activity threshold associated with it, and when the wireless activity threshold is exceeded, a PSAP is agitated. The agitated PSAP also has a wireless activity threshold associated with it, and when the wireless activity threshold is exceeded, another PSAP is agitated, which may or may not also have a wireless activity threshold associated with it. One or more of the VAPs and PSAPs can have multiple wireless activity thresholds, and as each wireless activity threshold is exceeded, an additional PSAP is agitated. In these implementations, each wireless activity threshold can be thought of as local with respect to an AP because the wireless activity near the AP is taken into consideration when determining whether the wireless activity threshold is exceeded.

More sophisticated implementations may include setting "floating" thresholds that vary depending upon the quantity, nature, and/or location of wireless activity within the wireless domain. As used herein, a wireless activity threshold that depends upon local wireless activity, but is not statically associated with a particular AP, is referred to as a "floating" wireless activity threshold, as opposed to an AP-specific wireless activity threshold, where it is desirable to draw a distinction between the two. A floating wireless activity threshold may be adjusted dynamically in response to the wireless activity data received while monitoring wireless activity. Depending upon the implementation, embodiment, configuration, and/or wireless activity data, determining a wireless activity threshold can dynamically increase or decrease in complexity depending upon conditions within the wireless domain. As used here, "dynamically" means "in response to changing conditions within the wireless domain." In these more sophisticated implementations, each wireless activity threshold can be thought of as local with respect to a potentially changing subset of APs in the wireless domain. For example, if wireless activity near a first subset of APs causes a PSAP to be agitated, it may be that a second overlapping subset of APs no longer "needs" a PSAP; the subset of APs associated with the dynamic wireless activity threshold changes over time. In this example, picture a wave of wireless activity that sweeps through a wireless domain, agitating PSAPs for a subset of APs on the crest of the wave, and de-agitating (or not agitating) PSAPs as the wave passes.

In the example of FIG. 2, the flowchart 200 continues to decision point 206 where it is determined whether wireless activity exceeds a wireless activity threshold. The wireless activity threshold can be global, AP-specific, or floating, depending upon the implementation and/or embodiment. Depending upon the implementation and/or embodiment, the wireless activity threshold can be exceeded if RF energy exceeds a certain amount, the number of non-AP stations to APs exceeds a certain ratio, traffic-specific (e.g., QoS) conditions are desired, and/or some other condition is desired.

If it is determined that the wireless activity threshold is not exceeded (206-N), then the flowchart 200 continues to module 208 where a PSAP is not agitated. In a typical implementation, this requires no action. However, the module 208 is included because it is possible to implement a system in which PSAPs remain agitated until explicitly de-agitated. In such an implementation, at module 208, a PSAP is "de-agitated." In any case, the flowchart 200 returns to module 202 and continues as described previously.

If, on the other hand, it is determined that the wireless activity threshold is exceeded (206-Y), then the flowchart 200 continues to decision point 210 where it is determined whether a duration of wireless activity exceeds a timer threshold. The timer threshold can be inherently or explicitly set to zero, which means that the determination is always "yes." However, since PSAPs take time to power up, brief spikes in wireless activity might cause a PSAP to power up and down more frequently than is desirable. To prevent PSAPs from powering up and down too frequently, a timer can be set. When the duration of wireless activity exceeds the duration of the timer, the timer threshold is exceeded.

If it is determined that the duration of wireless activity does not exceed a timer threshold (210-N), then the flowchart 200 returns to module 208 and continues as described previously. As indicated previously, in a typical implementation, no action is taken at module 208. However, it may be noted that in an implementation that includes "de-agitation" of PSAPs, de-agitation of a PSAP may not be required in this iteration of module 208 because the PSAP may or may not have been agitated previously, and therefore it is possible that no action is taken at module 208 in this implementation as well.

If, on the other hand, it is determined that the duration of wireless activity exceeds a timer threshold (210-Y), then the flowchart 200 continues to module 212 where a PSAP is agitated. The PSAP can be agitated in many ways. For example, power can be applied to the PSAP, a group of inactive components can be activated, instructions can be transmitted to the PSAP to cause the PSAP to resume normal operation, or another known or convenient agitation scheme can be applied. In a typical implementation, the PSAP remains agitated for a period of time that is greater than the time it takes to traverse the flowchart 200 back to decision point 206. This ensures that the PSAP will not power down while wireless activity remains above the wireless activity threshold, but before receiving subsequent agitation. This time period can also cause the PSAP to remain powered up for some period of time after wireless activity drops below the wireless activity threshold, which can ensure that the PSAP remains powered up during a brief drop in wireless activity. In an alternative implementation, the PSAP remains agitated until de-agitated. In any case, the flowchart 200 returns to module 202 and continues as described previously.

Figure 3:
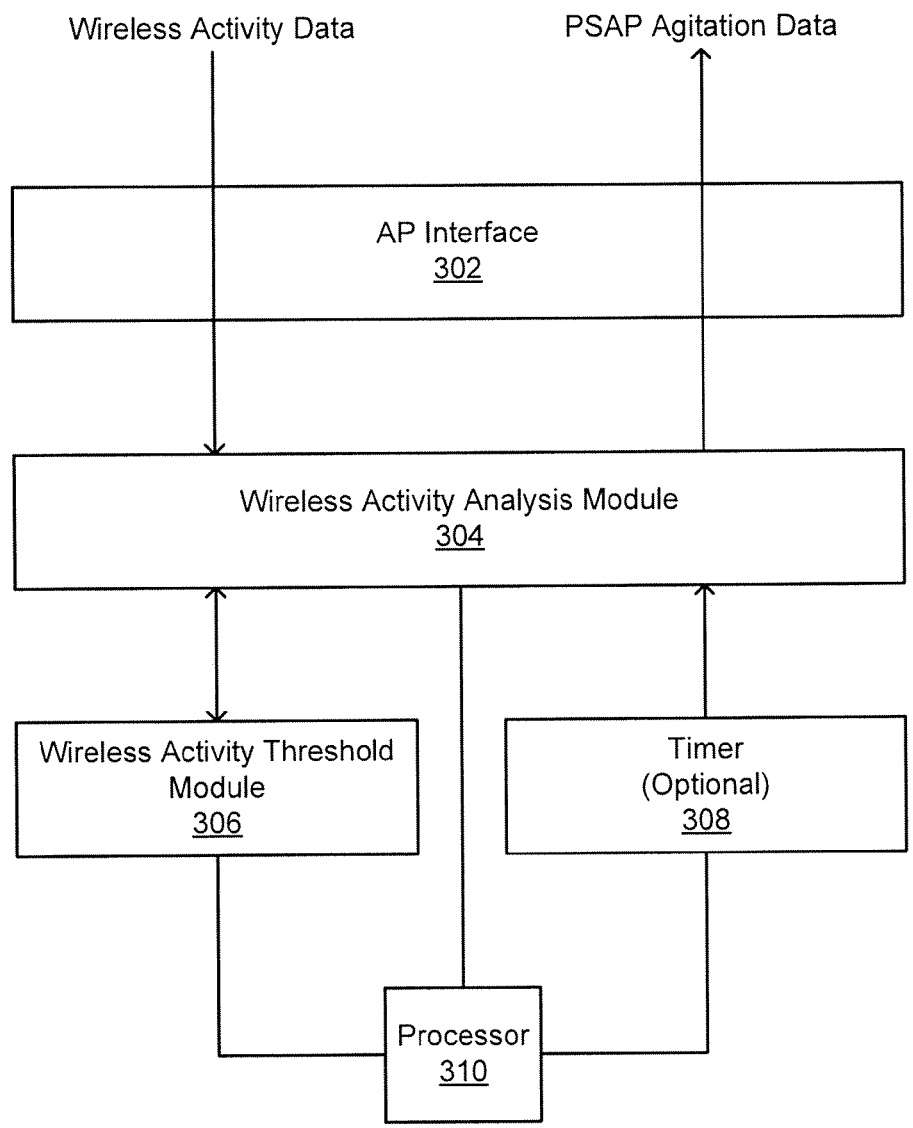
FIG. 3 depicts an example of a PSAP agitation (PSAPA) engine.

FIG. 3 depicts an example of a PSAPA engine 300. The PSAPA engine 300 can include a controller or a portion of a controller, a controller can include the PSAPA engine 300 or a portion of the PSAPA engine 300, or a controller and the PSAPA engine 300 can be distinct with respect to one another. The system 300 includes an AP interface 302, a wireless activity analysis module 304, a wireless activity threshold module 306, an optional timer 308, and a processor 310. The processor 310 is coupled to the wireless activity analysis module 304, the wireless activity threshold module 306, and the timer 308.

In the example of FIG. 3, the AP interface 302, receives wireless activity data from a VAP, active PSAPs, controllers, stations, and/or other engines associated with a wireless domain, or, more generally, a communications network. The AP interface 302 can interpret the wireless activity data in terms of a number, ratio, or other known or convenient value. For example, the wireless activity data can include a number associated with the number of wireless packets received at an AP and/or sent from the AP, the ratio of non-AP stations to VAPs or active PSAPs in a wireless domain or a portion of the wireless domain, etc. The wireless activity data can be in a general format that is similar to that provided from the APs of the wireless domain, or data from the APs can be preprocessed or compiled at, by way of example but not limitation, a controller or some other intermediate device.

In the example of FIG. 3, the wireless activity analysis module 304 receives the wireless activity data from the AP interface 302. A module, as used in this paper, can include hardware, firmware, or software implemented in hardware or firmware for execution by a processor. The wireless activity analysis module 304, together with the processor 310, can be referred to as a wireless activity analysis engine. The wireless activity analysis module 304 can receive a wireless activity threshold value from the wireless activity threshold module 306 and a timer threshold from the optional timer 308. In operation, the wireless activity analysis engine compares the wireless activity data to the wireless activity threshold, determines whether the wireless activity threshold has been exceeded and, if applicable, whether the wireless activity threshold has been exceeded for a requisite amount of time (i.e., the timer threshold has been exceeded). If the wireless activity threshold has been exceeded for the requisite amount of time, the wireless activity analysis engine sends PSAP agitation data through the AP interface 302. The PSAP agitation data can be sent directly to a PSAP, causing the PSAP to enable power-saving components, or the PSAP agitation data can be sent to an intermediate device, such as a controller, which can use the PSAP agitation data to determine which PSAPs to agitate, if any. A partially disabled PSAP may be able to "self-start" when given an agitation instruction, and a completely powered-down PSAP may receive power instead of or in addition to an agitation instruction. In an alternative embodiment, the wireless activity analysis engine sends PSAP agitation data as a report, regardless of whether a PSAP agitation is called for.

In the example of FIG. 3, the wireless activity threshold module 306 provides a wireless activity threshold to the wireless activity analysis module 304. The wireless activity threshold module 306, together with the processor 312, can be referred to as a wireless activity threshold engine. An initial wireless activity threshold value can be input by a human or software agent. The value represents an amount of wireless activity within a wireless domain or a portion of the wireless domain at which it is desirable (according to the agent or by default) to agitate PSAPs to handle some of the load. Depending upon the implementation and/or embodiment, the wireless activity threshold module 306 may or may not receive feedback from the wireless activity analysis module 304 that enables the wireless activity threshold module 306 to dynamically alter threshold values based upon wireless activity within a wireless domain or a portion of the wireless domain.

In the example of FIG. 3, the optional timer 308 provides a timer threshold to the wireless activity analysis module 304. The timer threshold may be represented, at least conceptually, as a number value. The optional timer 308 can also provide a first timestamp at a time when the wireless activity analysis engine determines that a wireless activity threshold has been exceeded, and a second timestamp at a later time. The timer threshold is exceeded when the difference between a first timestamp and a second timestamp is greater than the number value of the timer threshold. As used here, a timestamp is intended to include any value associated with a timer such that the wireless activity analysis module 304 can compare a first timestamp to a second timestamp to determine, or at least approximate, an amount of time has elapsed between receiving the first timestamp and the second timestamp. The exact nature or implementation of the timer 308 is not critical.

In the example of FIG. 3, in operation, wireless activity data is provided from the AP interface 302, a wireless activity threshold is provided from the wireless activity threshold module 306, and a timer threshold and timestamp is provided from the optional timer 308 to the wireless activity analysis module 304. The wireless activity analysis module 304 determines whether estimated wireless activity (derived from the wireless activity data) exceeds the wireless activity threshold, and has exceeded the wireless activity threshold for a duration that exceeds the timer threshold. When the wireless activity threshold and the timer threshold (if applicable) are both exceeded, and depending upon the implementation even when not exceeded, the wireless activity analysis engine sends PSAP agitation data through the AP interface 302.

Figure 4:
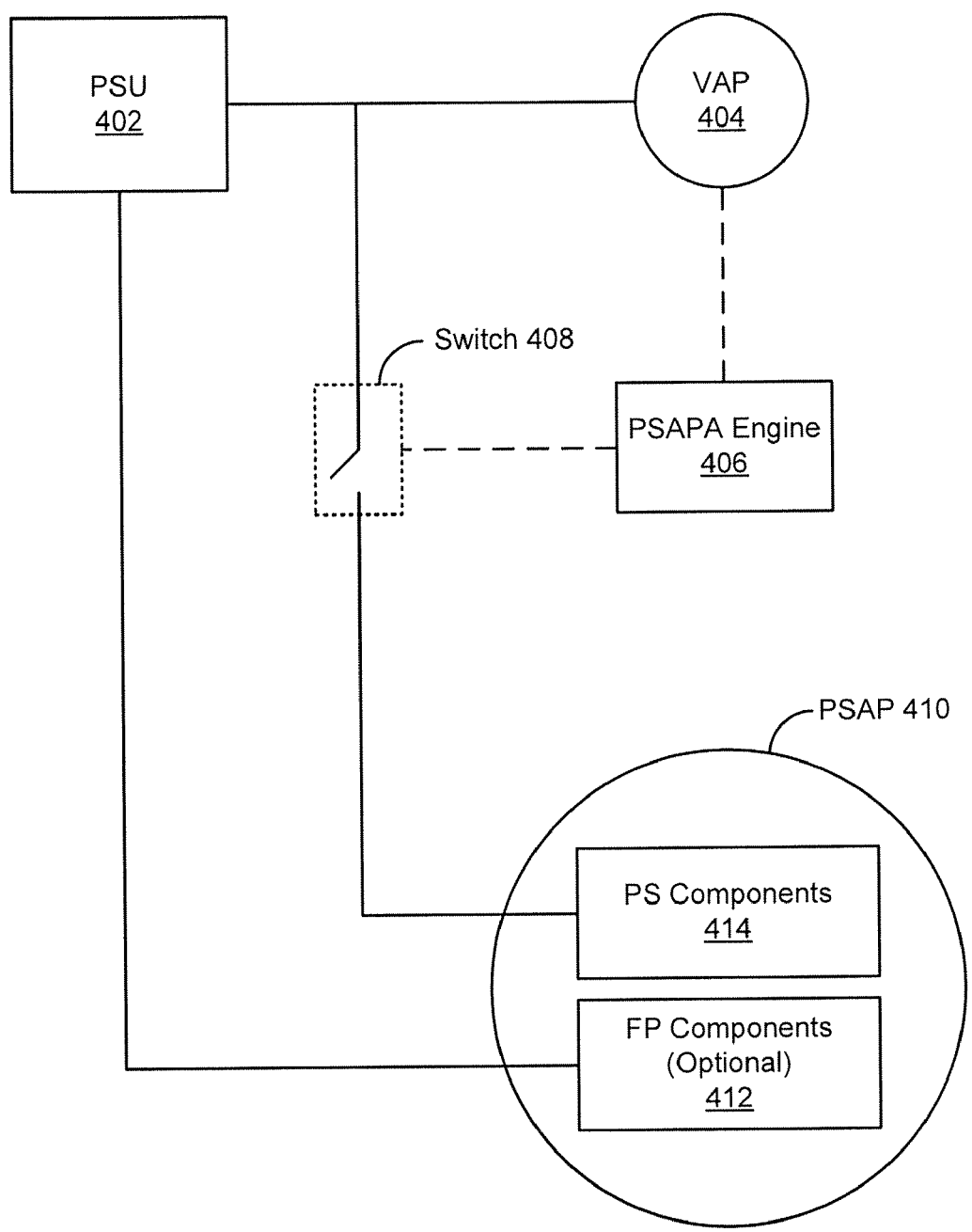
FIG. 4 depicts a system for providing power to APs in a power-saving wireless domain.

FIG. 4 depicts a system 400 for providing power to APs in a power-saving wireless domain. The system 400 includes a power supply unit (PSU) 402, a VAP 404, a PSAPA engine 406, a switch 408, and a PSAP 410. For illustrative simplicity, only one each of a VAP and PSAP are depicted, but, depending upon the implementation, there can be multiple VAPs or PSAPs in a wireless domain. The PSAP 410 includes optional full-power (FP) components 412 and power-saving (PS) components 414.

In the example of FIG. 4, the PSU 402 can be any known or convenient power source. Although in the example of FIG. 4, the PSU 402 appears to be external with respect to the APs, the PSU 402 can be implemented as batteries within one or more of the APs, and hence "distributed" within each of the APs. Also, the PSU 402 could be implemented as multiple power sources or provide power over Ethernet (PoE). The exact nature and implementation of the PSU 402 is not critical.

In the example of FIG. 4, the VAP 404 is operationally connected to the PSU 402. This is intended to show that the VAP 404 receives constant power and is, therefore, continuously powered up. Because it always has power, the VAP 404 can be configured for continuous monitoring of the wireless domain, if desired.

In the example of FIG. 4, the PSAPA engine 406 can be implemented as described with reference to FIG. 3, or using other techniques described in this paper.

In the example of FIG. 4, the switch 408 is coupled to the PSAPA engine 406. In this example, the switch 408 is closed (i.e., on) when the PSAPA engine 406 provides PSAP agitation data indicating that the PSAP 410 is to be agitated. In this example, the switch 408 is open (i.e., off) when the PSAPA engine 406 does not provide PSAP agitation data indicating that the PSAP 410 is to be agitated. The switch 408 is intended to be a conceptual representation of when power is provided to the PS components 414 of the PSAP 410, not an actual hardware switch or transistor, though it could be implemented as such; the switch 408 is a "logical" switch.

In the example of FIG. 4, the PSAP 410 includes optional FP components 412 that are operationally connected to the PSU 402. Thus, the FP components 412 are always on. The FP components 412 might include, by way of example but not limitation, components that consume relatively little power, a radio receiver, or some other component. In an AP, the radio typically consumes by far the most power; so if the FP components 412 include everything except the radio, the PSAP 410 can conserve significant power in sleep mode. Although it consumes quite a bit of power, it might be desirable to make the radio receiver (but not transmitter) one of the FP components 412 to ensure that the PSAP 410 can listen for wireless activity. If the radio receiver is one of the FP components 412, then the PSAP 410 may be able to enter a "sentry mode" and help monitor the wireless domain.

The PS components 414, on the other hand, receive power from the PSU 402 through the switch 408. Thus, the PS components 414 are only on when the switch 408 is closed. The PS components 414 might include, by way of example but not limitation, a radio transmitter, a radio receiver, or any other component. If there are no (optional) FP components 412, then all of the components are PS components 414.

Where there are FP components, the radio transmitter, since it is typically the greatest consumer of power on an AP, is likely to be one of the PS components 414.

The example of FIG. 4 is intended to illustrate a simple, conceptual example. More complex PSAPs may have multiple power levels, such as FP, sentry (e.g., transmitters off), minimal power (e.g., radios off), and powered down. Moreover, a VAP could include one or more extra radios, and perhaps other components, that act like an "onboard" PSAP. Such an AP could be referred to as a power-saving vigilant AP (PSVAP).

In the example of FIG. 4, in operation, the VAP 404 and the FP components 412 of the PSAP 410 receive power from the PSU 402. The PSAP 402 is, for illustrative purposes, assumed to be asleep (and not in sentry mode), which for this example means that the switch 408 is open and the PS components 408 are disabled. The VAP 404 monitors nearby stations and provides wireless activity data to the PSAPA engine 406. The PSAPA engine 406 determines that the wireless activity has passed a wireless activity threshold and, if applicable, a timer threshold. So the PSAPA engine 406 sends a command to the switch 408 to close the switch 408, thereby providing power from the PSU 402 to the PS components 414 of the PSAP 410. Alternatively, the PSAPA engine 406 could provide an instruction to the VAP 404, which then instructs the PSAP 410 to enter FP mode. When the PSAP 410 is powered up, it can perform any of the functions that the VAP 404 can, assuming it is configured to do so. Later, when wireless activity dips below a wireless activity threshold, the PSAPA engine 406 may open the switch 408, causing the PSAP 410 to drop back into PS mode.

Figure 5:
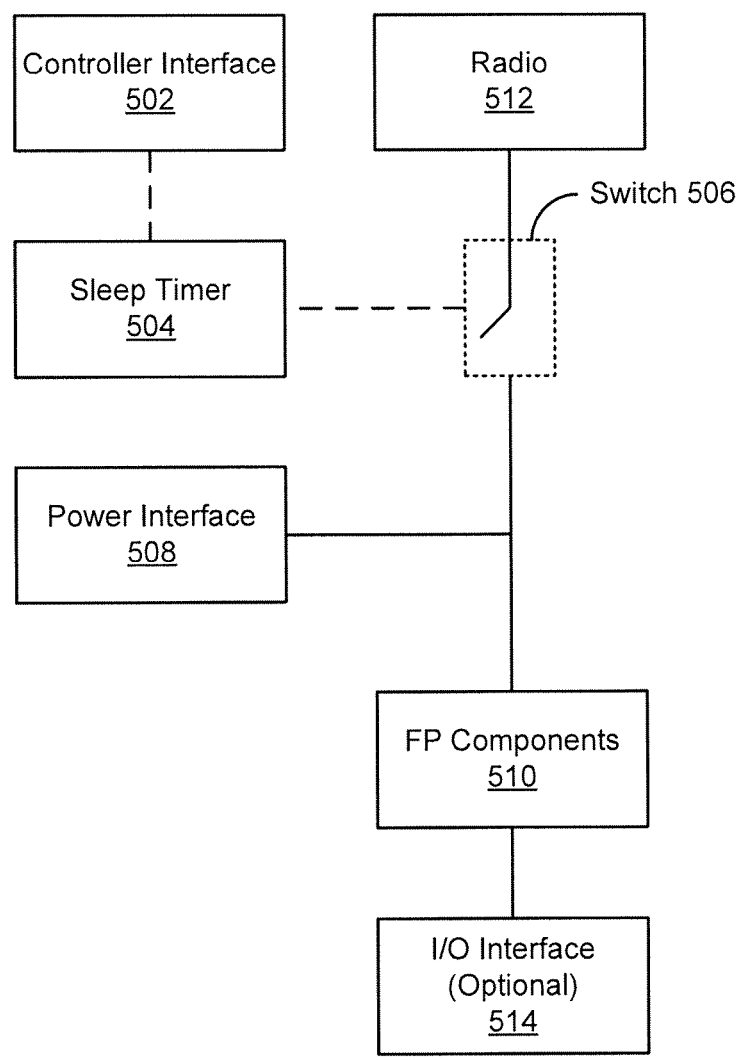
FIG. 5 depicts an example of a PSAP.

FIG. 5 depicts an example of a PSAP 500. The PSAP 500 includes a controller interface 502, a sleep timer 504, a switch 506, a power interface 508, FP components 510, a radio 512, and an optional I/O interface 514.

In the example of FIG. 5, the controller interface 502 can be implemented, by way of example but not limitation, as an interface to a wired backbone to which a controller is coupled. The interface can be, by way of example but not limitation, an Ethernet interface. It would typically be undesirable to disable the controller interface 502 when the PSAP 500 is asleep because it takes relatively little power to keep, for example, an Ethernet interface, enabled. However, in an implementation, the controller interface 502 could be powered down and the PSAP 500 would presumably first receive power from the power interface 508, power up some low power components including the controller interface 502, and go from there.

In the example of FIG. 5, the sleep timer 504 can be implemented as a timer having a start time and an end time. The timer can be reset when the sleep timer 504 receives a wakeup command, and continues running from the start time to the end time. While the timer is running, the sleep timer 504 outputs a wakeup signal. When the timer reaches the end time, the sleep timer 504 ceases outputting the wakeup signal. It can be advantageous to use a pseudo random number generator to set the end time of the timer to prevent coincidental deactivation of multiple PSAPs, each having the same timer duration; simultaneous deactivation of many PSAPs could be undesirable. As a general rule, if the end time is set to a relatively high value, the PSAP will consume relatively large amounts of power. On the other hand, if the end time is set to a relatively low value, the PSAP is more likely to need to be agitated prior to providing service to a station, which, at least potentially, can result in delay.

In the example of FIG. 5, the switch 506 is coupled to the sleep timer 504 and can be implemented as a hardware or logical switch in any applicable known or convenient manner. While the switch 506 receives the wakeup signal from the sleep timer 504, the switch 506 is closed (i.e., on). While the switch 506 is not receiving the wakeup signal from the sleep timer 504, the switch 506 is open (i.e., off).

In the example of FIG. 5, the power interface 508 can be implemented as an interface to a PSU (e.g., an external power source, a battery, or some other power source) in any applicable known or convenient manner. In certain implementations, the controller interface 502 and the power interface 508 can be thought of as a single interface. For example, a PoE system provides both power and data through an Ethernet interface.

In the example of FIG. 5, the power interface 508 couples power from a power source to the FP components 510. The FP components 510, in this example, include components of the PSAP 500 that draw power, such as a processor, memory, etc., but excluding the radio 512. As was discussed previously in this paper, a PSAP can be implemented without any FP components, and activated by first providing power on the power interface 508.

In the example of FIG. 5, the power interface 508 couples power from a power source to the radio 512 so long as the switch 506 is closed. In this way, the radio 512 draws power only when the sleep timer 504 is outputting a wakeup signal, and the radio 512 does not draw power (i.e., it is off) when the sleep timer 504 is not outputting a wakeup signal.

In the example of FIG. 5, the optional I/O interface 514 can be associated with a display (e.g., light emitting diodes (LEDs) or a liquid crystal display (LCD)) or input device (e.g., a power button or dial). A display can, for example, enable a user to see whether the PSAP is asleep or at full power at a glance. An input device can, for example, enable a person to force the PSAP to remain in a full power mode. The I/O interface 514 is optional because control of the AP could, in at least some implementations, be handled entirely through the controller interface 502 or the radio 512.

Advantageously, a PSAP implemented as described with reference to FIG. 5 causes the PSAP to power up when a PSAPA engine determines that it should, and to remain powered up even if there is a brief period of less activity. Thus, the PSAP will not power up and power down too often. What constitutes "too often" can depend upon the amount wireless activity, the type of wireless activity, and/or the opinion of an agent who can set the duration of the sleep timer.

Figure 6:
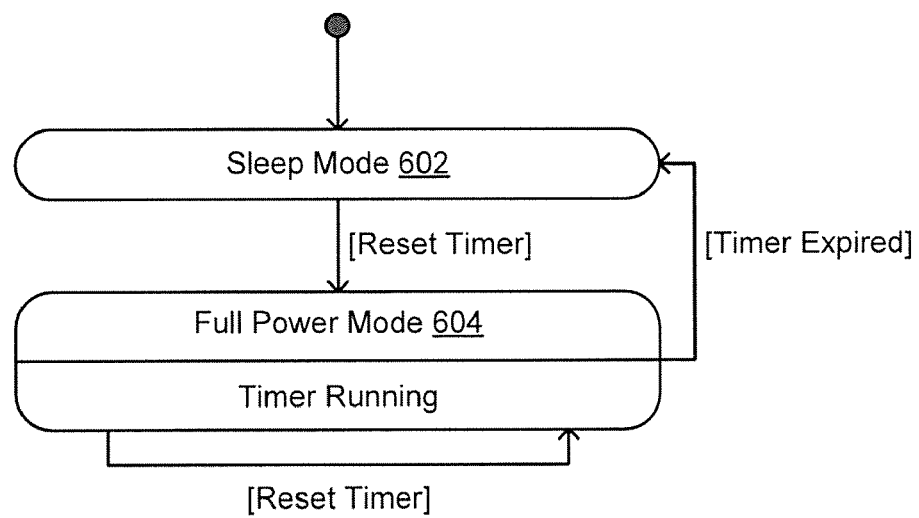
FIG. 6 depicts a state diagram of an example of states of a PSAP alternating between full power and sleep mode.

FIG. 6 depicts a state diagram 600 of an example of states of a PSAP alternating between full power and sleep mode. For illustrative purposes only, the state diagram 600 starts at state 602, where the PSAP is in sleep mode. In sleep mode, some or all of the power-consuming components of the PSAP are disabled so that the components do not consume power, or at least draw less power than when enabled. In an alternative embodiment, the state diagram 600 could start in full power mode (e.g., when the PSAP is turned on for the first time, it could operate at full power until the timer expires).

A transition event from the state 602 to the state 604 is [Reset Timer]. The state diagram 600 continues to the state 604, where the PSAP is in full power mode. The timer can be reset when the PSAP receives a wakeup command. When the PSAP receives the wakeup command, the PSAP approximately contemporaneously sets the timer to a start value and draws power sufficient to enable at least some of the disabled components. While the PSAP is in full power mode, the timer is running.

There are two transition events from the state 604. The first transition event from the state 604 is actually a loop [Reset Timer]. Just as when the PSAP is in sleep mode, the PSAP can receive a wakeup command. When the PSAP receives the wakeup command, the PSAP resets the timer to the start value and continues to draw power. For illustrative convenience, the start value is assumed to be zero. It should be noted that the end value could be reset to, potentially, a different value each time the timer is reset. This can ensure that nearby PSAPs do not respond to similar wireless activity fluctuations and go into sleep mode at the same time.

The second transition event from the state 604 is to the state 602 and is [Timer Expired]. The timer will eventually expire if the PSAP does not receive wakeup commands.

In an alternative implementation, instead of wakeup commands, the PSAP could receive power when it is time to switch from sleep mode to full power mode. In this alternative implementation, there may or may not still be a timer, but the timer may be remotely located with respect to the PSAP.

In another alternative, the timer could run while the PSAP is in sleep mode. In this alternative, the PSAP would need to receive sleep commands in order to go to sleep, and would otherwise remain at full power.

FIGS. 7A to 7E depict conceptual diagrams of a power-saving wireless domain as it changes over time. The examples of FIGS. 7A to 7E will be used to illustrate wireless activity thresholds. The conceptual diagrams include multiple VAPs 702, each surrounded by a dashed line intended to denote wireless coverage, and multiple PSAPs 704. Shading is used to denote which of the APs are in full power mode. Thus, the VAPs 702 are always shaded, since they are always in full power mode, and the PSAPs 704 may or may not be shaded, because they can alternate between full power mode and sleep mode. When reference is made to one of the APs, it is given a new reference numeral. When no reference is made to an AP, the AP is given the reference numeral 702 (for VAPs) or 704 (for PSAPs).

Areas of high wireless activity are represented by a wireless activity cloud 706. "High" may be defined in accordance with implementation-specific parameters or dynamically, but as a rule it means a human or software agent has determined that a PSAP near the wireless activity should be agitated when the wireless activity reaches this level (and, if applicable, stays at this level for a period of time).

Areas of low wireless activity are represented by a wireless activity cloud 724. "Low" may be defined in accordance with implementation-specific parameters or dynamically, but as a rule it means a human or software agent has determined that an agitated PSAP near the wireless activity should not be further agitated when the wireless activity reaches this level (and, if applicable, stays at this level for a period of time).

It should be noted that for less sophisticated wireless domains, identification of an area of high wireless activity could be less granular than in more sophisticated wireless domains. For example, in a simple implementation, each of the VAPs 702 could be denoted as having a certain amount of wireless activity such that the wireless activity covers the exact same area as the VAPs 702 cover. (In these conceptual diagrams, that means the area of wireless activity would be exactly the dashed line around the VAPs 702 that denotes wireless coverage.) In a somewhat more sophisticated wireless domain, the areas of overlapping VAP 702 coverage could have a different value than the non-overlapping portions. In an even more sophisticated model, estimated locations of stations within the wireless domain or other considerations could be used to fine-tune estimates of high wireless activity. As PSAPs 704 awaken, they can improve estimates, as well.

Less sophisticated wireless domains might also use less information about the wireless domain to agitate PSAPs 704. For example, in a simple implementation, any of the PSAPs 704 that lie in an area of high wireless activity could be agitate. The advantage of this simple implementation is that it does not require any coordination among the VAPs 702 to try to locate the activity. So if a VAP hears activity above a wireless activity threshold, it can simply inform the PSAPs within range (if they are in sentry mode, and can hear radio transmissions) or a controller (not shown) can agitate PSAPs it knows to be near VAPs in areas of high wireless activity. PSAPs that are agitated but cannot find enough work can then simply fall back asleep. A more sophisticated wireless domain might, for example, only agitate the number of VAPs in an area of high wireless activity that seem to be needed.

Figure 7A:
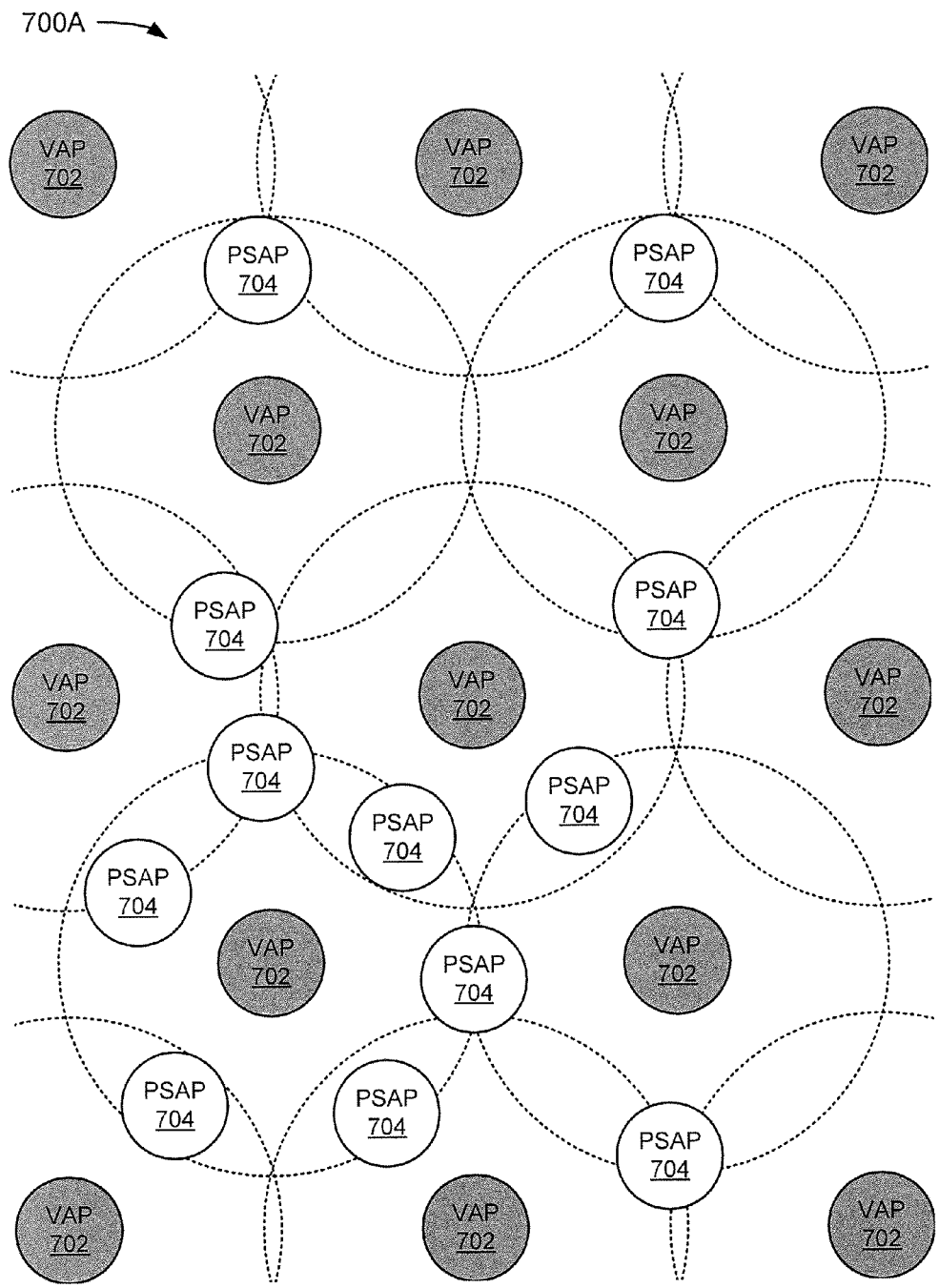
FIGS. 7A to 7E depict conceptual diagrams of a power-saving wireless domain as it changes over time.

In the example of FIG. 7A, the wireless domain 700A has each VAP 702 at full power and each PSAP 704 in sleep mode. There are no areas of high wireless activity. A wireless domain will not necessarily ever reach this default state. For example, PSAPs 704 could be at full power by default, and wireless activity never drop below a threshold for a sufficient amount of time for each of the PSAPs 704 to enter sleep mode. Nevertheless, this is a good logical start to a discussion of how a power-saving wireless domain changes over time.

Figure 7B:
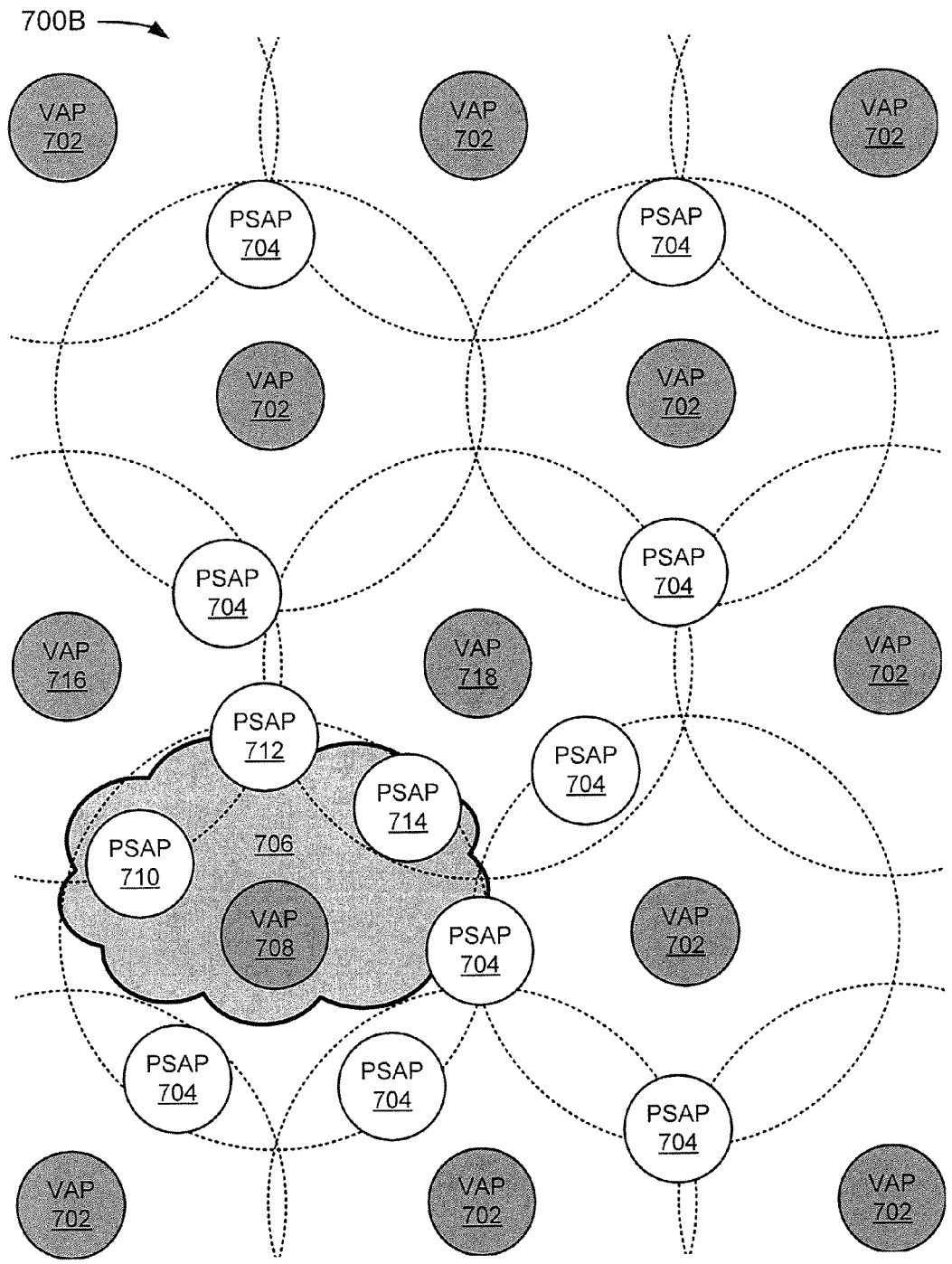

In the example of FIG. 7B, the wireless domain 700B has an area of high wireless activity 706. The VAP 708 is located within the area of high wireless activity 706, as are the PSAPs 710, 712, 714. For illustrative purposes, it is assumed that if an AP touches the area of high wireless activity 706, it is "in" the area. It is assumed for illustrative purposes that the high wireless activity has persisted for a requisite amount of time, if applicable. So a PSAPA engine or controller (not shown) must determine which or how many of the PSAPs 710, 712, 714 to agitate. It may be desirable to agitate the PSAP 710 if wireless activity is relatively high near the VAP 716, to agitate the PSAP 712 if wireless activity is relatively high near both the VAP 716 and the VAP 718, or to agitate the PSAP 714 if wireless activity is relatively high near the VAP 718. If wireless activity is approaching a high wireless activity threshold near both the VAP 716 and the VAP 718, it may be desirable to agitate both the PSAP 710 and the PSAP 714, or even all three of the PSAPs 710, 712, 714. A sophisticated algorithm could take into account even more distant wireless activity, such as in the upper right quadrant of the wireless domain 700B, when deciding which PSAPs to agitate, and might determine to agitate a PSAP outside of the area of high wireless activity 706 to, for example, draw wireless traffic away from the area.

Figure 7C:
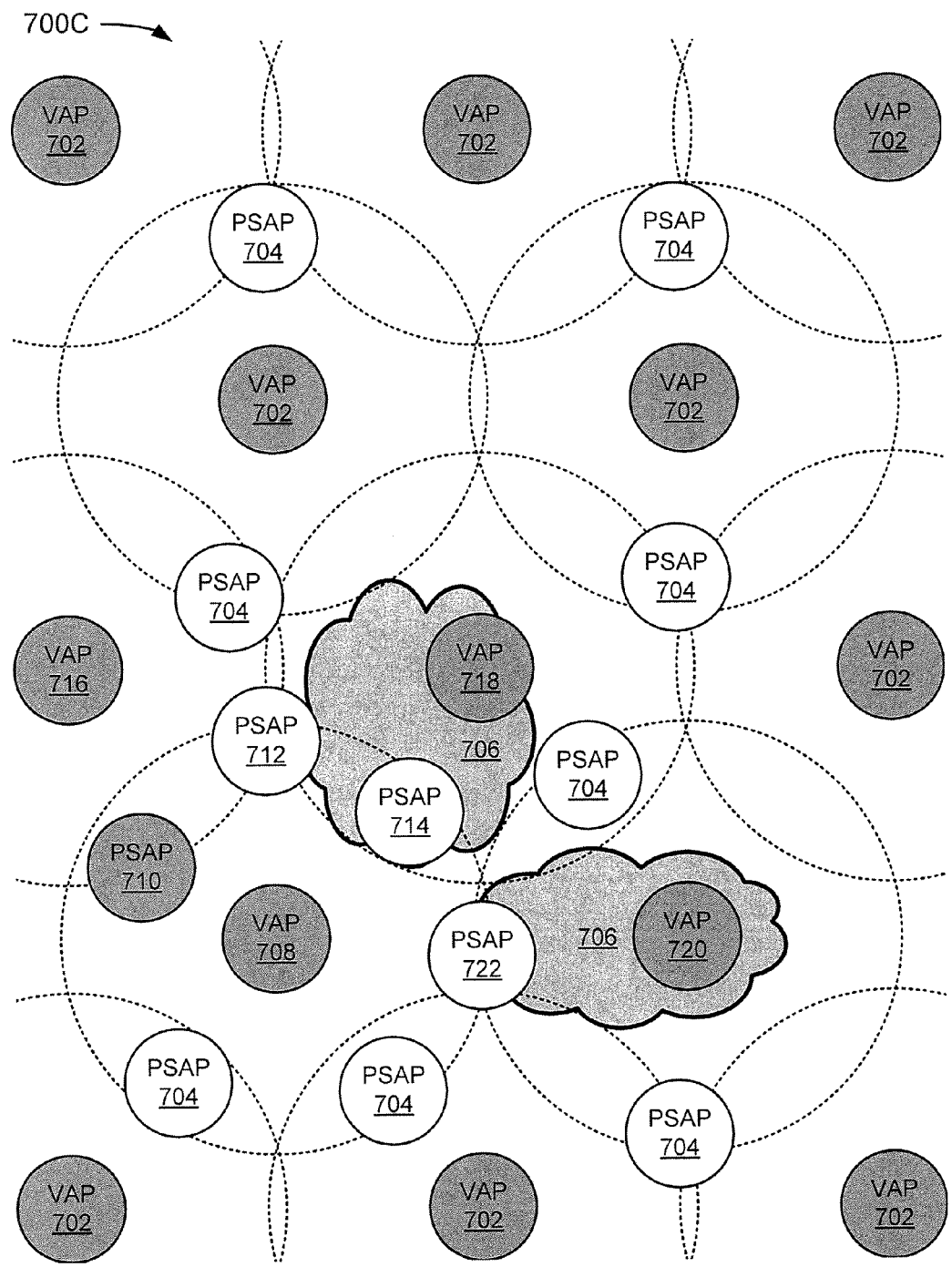

In the example of FIG. 7C, the wireless domain 700C has new areas of high wireless activity 706, and the PSAP 710 has been agitated. Since the PSAP 710 can handle some of the wireless load nearby, even if the wireless activity is the same near the VAP 708, it is not treated as "high wireless activity" because of the definition used here; high wireless activity means that it is desirable to agitate another PSAP. The current areas of high wireless activity 706 are near the VAP 718, 720, and in the overlapping areas between the VAP 708, 718 and the VAP 708, 720. This suggests that the highest aggregate amount of wireless activity is still near the VAP 708, which already has the PSAP 710 agitated nearby to lighten the load.

There are again multiple options, and the best choice may be a guess, or may be based upon additional data available to, for example, a PSAPA engine (not shown). Some plausible choices might include agitating one of the PSAPs 712, 714, 722 or agitating both of the PSAPs 714, 722, which are located within the respective high wireless activity areas 706. One could also cease agitating the PSAP 710 in favor of both of the PSAPs 714, 722.

Figure 7D:
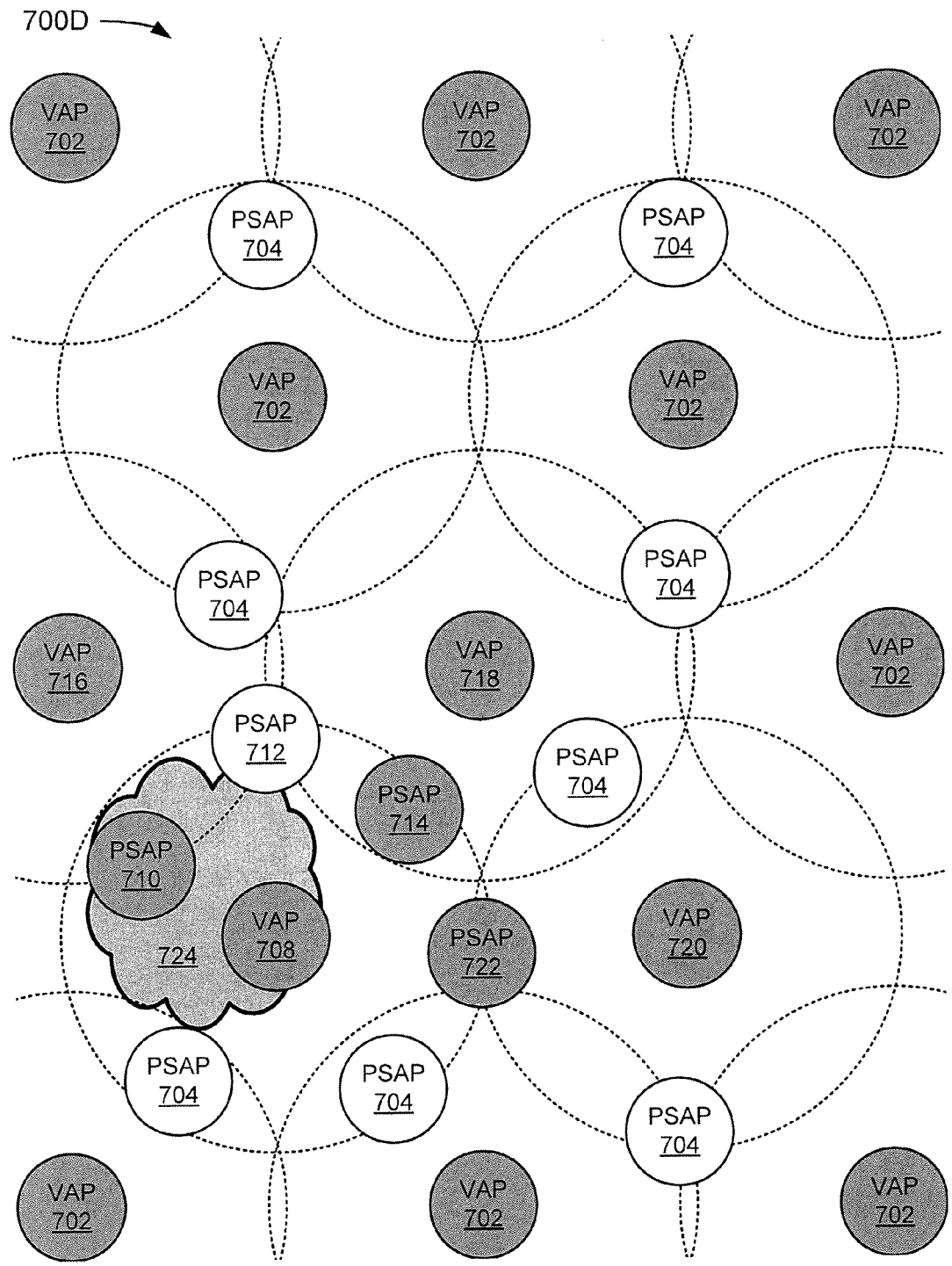

In the example of FIG. 7D, the wireless domain 700D now has an area of low wireless activity 724, and the PSAPs 714, 722 have been agitated. It may be that wireless activity has decreased, or it may be that the agitation of PSAPs 714, 722 drew sufficient traffic away from the PSAP 710 that it is no longer needed. In any case, an obvious choice is to stop agitating the PSAP 710, which will eventually (or perhaps immediately, depending upon the implementation) cause the PSAP 710 to go to sleep.

Figure 7E:
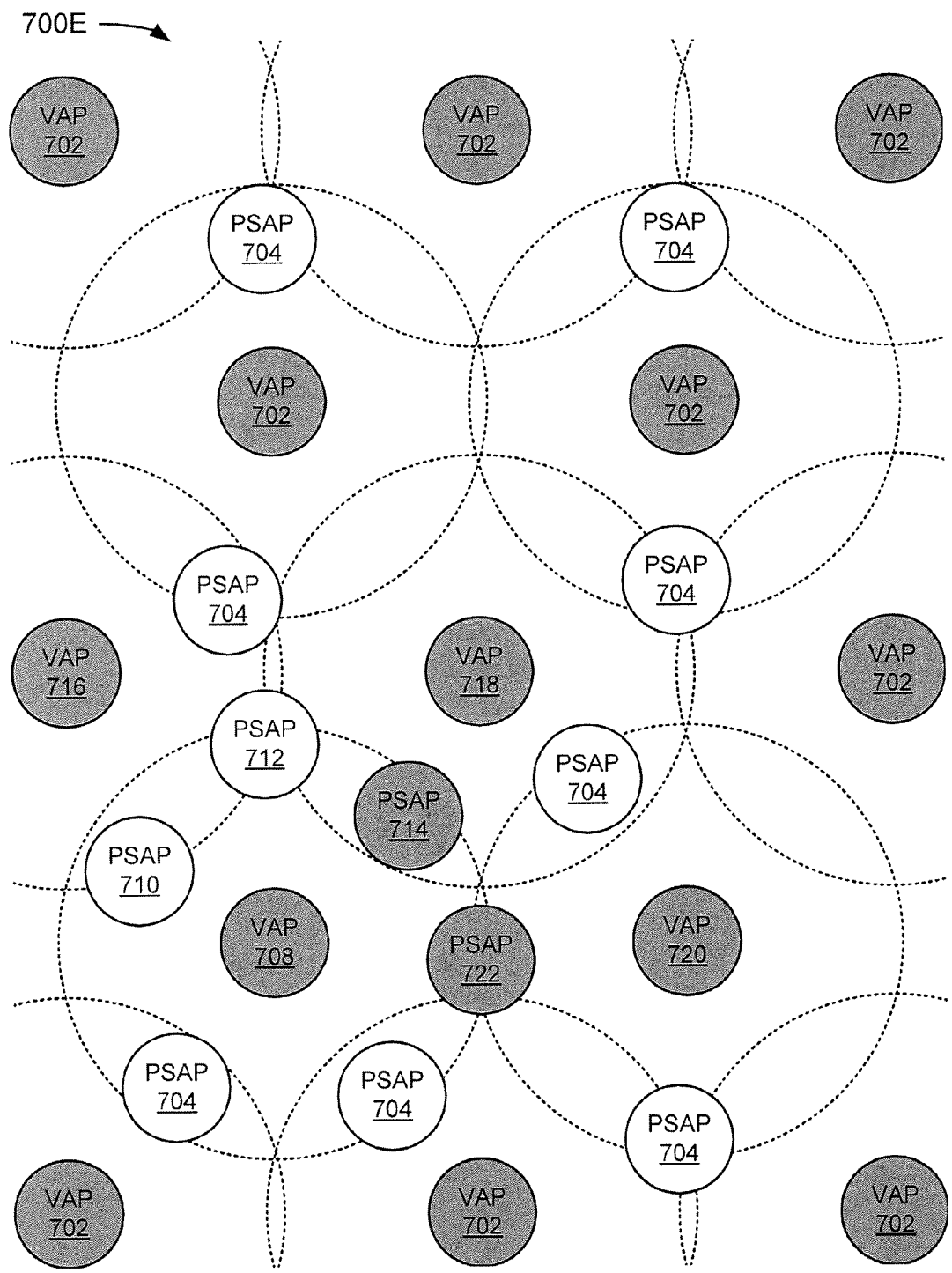

In the example of FIG. 7E, there are no areas of high or low wireless activity, as defined here, and the PSAP 710 has gone back to sleep.

Figure 8:
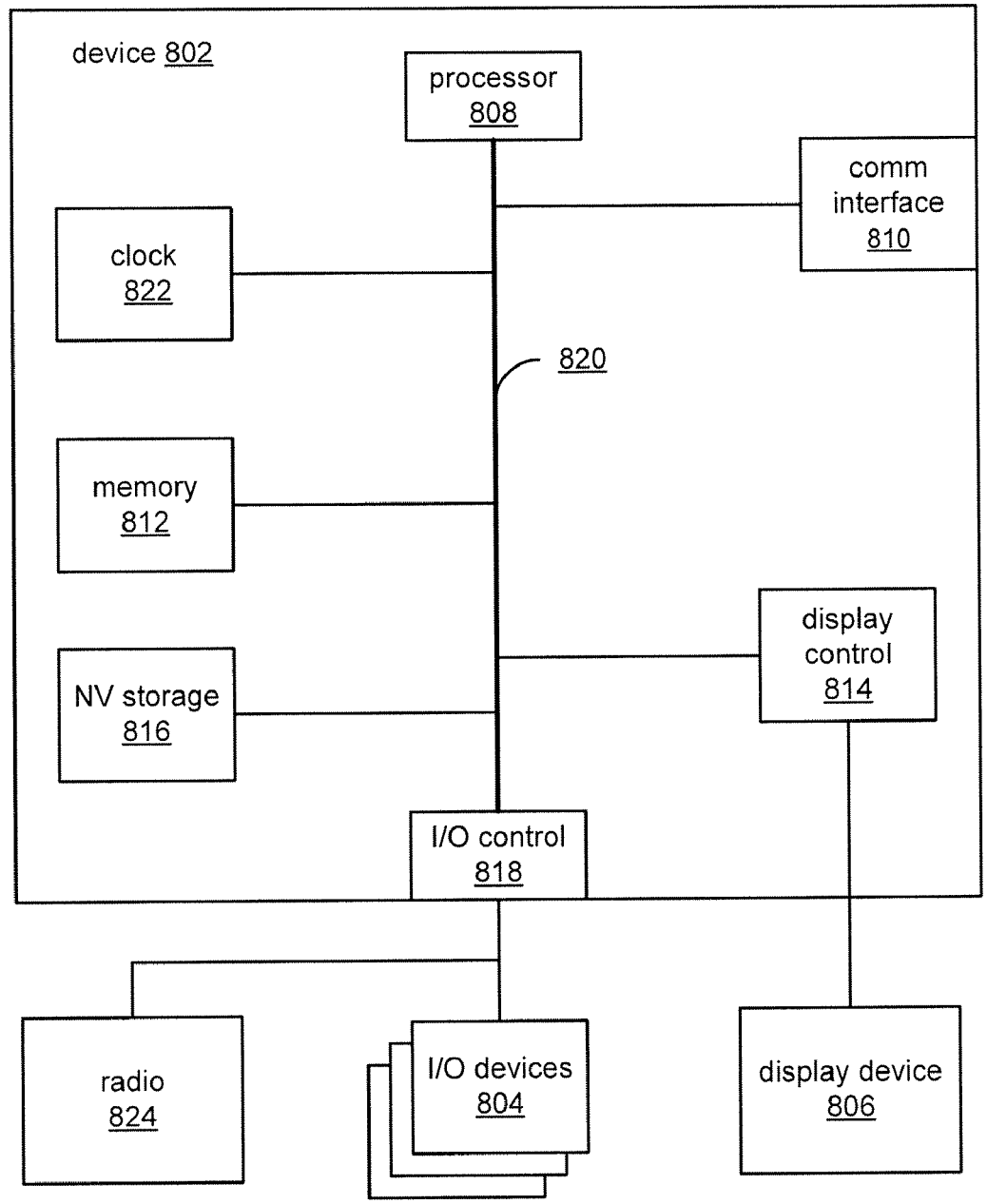
FIG. 8 depicts an example of a computing system that is representative of the computing systems discussed herein.

FIG. 8 depicts an example of a computing system 800 that is representative of the computing systems discussed herein. The system 800 may be a conventional computer system that can be used as a client computer system, such as a wireless client or a workstation, or a server computer system. The system 800 includes a device 802, I/O devices 804, and a display device 806. The device 802 includes a processor 808, a communications interface 810, memory 812, display controller 814, non-volatile storage 816, I/O controller 818, clock 822, and radio 824. The device 802 may be coupled to or include the I/O devices 804 and the display device 806.

The device 802 interfaces to external systems through the communications interface 810, which may include a modem or network interface. It will be appreciated that the communications interface 810 can be considered to be part of the system 800 or a part of the device 802. The communications interface 810 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 808 may be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, to the display controller 814, and to the I/O controller 818.

The I/O devices 804 can include a keyboard, disk drives, printers, a scanner, and other input and output devices, including a mouse or other pointing device. The display controller 814 may control in the conventional manner a display on the display device 806, which can be, for example, a cathode ray tube (CRT) or liquid crystal display (LCD). The display controller 814 and the I/O controller 818 can be implemented with conventional well known technology.

The non-volatile storage 816 is often a magnetic hard disk, flash memory, an optical disk, or another form of storage for large amounts of data. Some of this data is often written, by a direct memory access process, into memory 812 during execution of software in the device 802. One of skill in the art will immediately recognize that the terms "machine-readable medium" or "computer-readable medium" includes any type of storage device that is accessible by the processor 808.

Clock 822 can be any kind of oscillating circuit creating an electrical signal with a precise frequency. In a non-limiting example, clock 822 could be a crystal oscillator using the mechanical resonance of vibrating crystal to generate the electrical signal.

The radio 824 can include any combination of electronic components, for example, transistors, resistors and capacitors. The radio is operable to transmit and/or receive signals.

The system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

In addition, the system 800 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 816 and causes the processor 808 to execute the various acts required by the operating system to input and output data and to store data in memory, including storing files on the non-volatile storage 816.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of these teachings.

What is claimed is:

1. A method comprising:
   estimating wireless activity in at least a first portion of a wireless domain using wireless activity data associated with the first portion of the wireless domain to define an estimated wireless activity, the first portion of the wireless domain including (1) a vigilant access point in a powered state and (2) a first power-saving access point (PSAP) in a powered state; and
   if the estimated wireless activity exceeds a first wireless activity threshold, but not a second wireless threshold higher than the first wireless threshold, not sending a wakeup command to a second PSAP that is included in a second portion of the wireless domain different from the first portion wireless domain; and
   if the estimated wireless activity exceeds the second wireless activity threshold, transmitting a wakeup command to the second PSAP.

2. The method of claim 1, further comprising monitoring the wireless domain to obtain the wireless activity data.

3. The method of claim 1, further comprising receiving at least a portion of the wireless activity data from the vigilant access point in the wireless domain.

4. The method of claim 1 further comprising supplying power to the second PSAP.

5. The method of claim 1, further comprising supplying power over Ethernet (PoE) to the second PSAP if the estimated wireless activity has exceeded the second wireless activity threshold.

6. An apparatus, comprising:
   a wireless activity analysis module configured to be coupled to an access point that is disposed in a first wireless domain,
   the wireless activity analysis module configured to compare, based on wireless activity data, an estimated wireless activity of the first wireless domain to (1) a first wireless activity threshold and (2) a second wireless activity threshold, and
   the wireless activity analysis module configured to not provide a power-saving access point (PSAP) that is located in a second wireless domain different from the first wireless domain with agitation data when the estimated wireless activity exceeds the first wireless activity threshold for a period of time but not the second wireless activity threshold, and
   the wireless activity analysis module configured to provide the PSAP with agitation data when the estimated wireless activity exceeds the second wireless activity threshold for the period of time.

7. The apparatus of claim 6, wherein the wireless activity analysis module is configured to receive at least a portion of the wireless activity data from the access point.

8. The apparatus of claim 6, wherein the PSAP agitation data, or a wakeup signal derived therefrom, is configured to awaken the PSAP in response to the PSAP receiving the PSAP agitation data, or wakeup signal derived therefrom.

9. The apparatus of claim 6, wherein the PSAP agitation data, or a wakeup signal derived therefrom, is configured to cause the PSAP to reset a timer associated with remaining in an agitated state.

10. The apparatus of claim 6, wherein the wireless activity data is associated with IEEE 802.11 standards-compliant communications.

11. An apparatus, comprising:
    a first access point including a timer, a switch, and a radio;
    the first access point configured to be disposed within a first area of wireless activity and configured to be coupled to an access point agitation engine communicating with a second access point that is disposed within a second area of wireless activity different from the first area of wireless activity,
    the first access point configured to receive a wakeup signal from the access point agitation engine when wireless activity within the second area exceeds a first wireless activity threshold for a period of time, the first wireless activity threshold being higher than a second wireless activity threshold that is higher than a third wireless activity threshold,
    the switch being in a closed position, in response to the wakeup signal and, when the timer is moving from a start time to an end time,
    the switch, when in the closed position, configured to be coupled to a power interface such that power flows from the power interface to the radio through the switch.

12. The apparatus of claim 11, wherein the first access point further includes a controller interface coupled to the timer,
    in operation, the wakeup signal received on the controller interface causes the timer to be reset to the start time.

13. The apparatus of claim 11, wherein the end time is represented by a first value at a first time and is represented by a second value at a second time different than the first time.

14. The apparatus of claim 11, wherein the first access point further includes one or more full power components that are coupled to the power interface, the first access point configured to receive power through the power interface when the switch is in an open position.

15. The apparatus of claim 11, wherein the first access point is configured to reset the timer to the start time upon receipt of the wakeup signal.

16. The apparatus of claim 11, wherein the radio is a first radio, the apparatus further comprising a second radio coupled to the power interface, in operation, in a vigilant mode, the second radio receives power from the power interface while the first radio is off.

* * * * *